H. SMYTH.
Wheel Plow.
No. 49,564.
Patented Aug. 22, 1865.
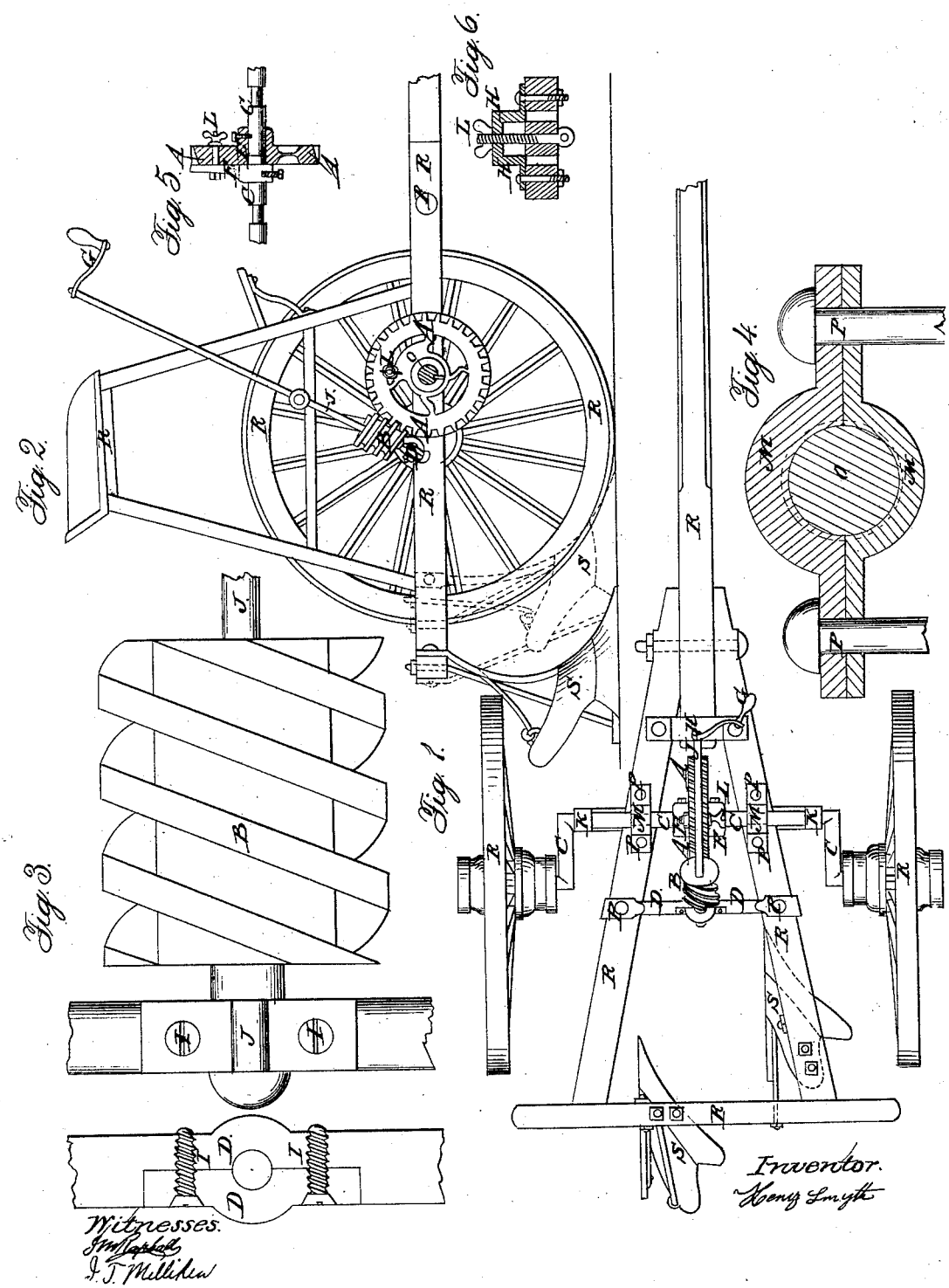

UNITED STATES PATENT OFFICE.

HENRY SMYTH, OF SAN LORENZO, CALIFORNIA.

IMPROVEMENT IN GANG-PLOWS.

Specification forming part of Letters Patent No. 49,564, dated August 22, 1865.

*To all whom it may concern:*

Be it known that I, HENRY SMYTH, of San Lorenzo, in the county of Alameda and State of California, have invented a new and useful Improvement in the Manufacture of Gang-Plows, and known as "Henry Smyth's Gang-Plow;" and I do hereby declare that the following is a full, clear, and exact description of the construction and operation of the same, reference being had to the annexed drawings, making a part of this specification, in which—

Figure 1 shows a ground plan of the plow, in which R represents the wheelwright or wood work of the plow—viz., the body, tongue, wheels, &c. A is an ordinary iron cog-wheel, which works in the wheel or endless screw B, which is turned by means of the rod J, which is put in motion by turning the crank G. C is an eccentrical shaft or axle, which is constructed in two pieces. That part of the eccentrical shaft or axle C which is attached to the off wheel is fastened to and forms a part of the cog-wheel A, and the part of the eccentrical shaft or axle C which is attached to the nigh wheel is fastened to a lever, F, and made fast to the cog-wheel, and held there by means of a thumb-screw, L, which works in a hollow space in the cog-wheel A. This arrangement is for the purpose of being able, when plowing and the off wheel has to run in a furrow, to lower the other side of the body of the plow R, so that the plowshares S will run on the same level and plow the same depth. This is effected by loosening the thumb-screw L, which runs through the lever F, to which it is fastened, to that part of the eccentrical shaft or axle C that is attached to the nigh wheel, which thumb-screw L fastens the lever F to the cog-wheel A. When loosened the body of the plow can be easily lowered to the required level, which when attained the thumb-screw L is tightened and will hold and keep it in that position. The eccentrical shaft or axle C is so constructed that the body of the plow can be raised or lowered from one to fourteen inches, the elbows or cranks of the eccentrical shaft or axle C being seven inches in length. E are the couplings of the eccentrical shaft or axle. D is the screw-bearer; P, the bolts. M are the boxes which hold the eccentrical shaft or axle C in their place to the body of the plow. P are the bolts. K are two iron arms or braces for the purpose of supporting and strengthening the eccentrical shaft or axle C. H is the tongue-regulator, and is furnished with a thumb-screw, so as either to raise or lower the tongue, as may be required.

Fig. 2 represents a side section, in which R shows the wheelwright or wood work of the plow—viz., the body, tongue, wheels, seat, &c.; A, the cog-wheel; F, the lever; L, the thumb-screw; C, a section of the eccentrical shaft or axle; D, the screw-bearer; B, the wheel or endless screw; J, the rod; G, the crank which turns the rod J; P, the section of bolt, and S the plowshares.

Fig. 3 shows, in full size, a view of the wheel or endless screw B, sections of the rod J, the box-screws I, and the screw-bearer D.

Fig. 4 shows a full-size view of the box M, which holds the eccentrical shaft or axle C to the body of the plow; C, the eccentrical shaft or axle, and P the bolts.

Fig. 5 shows a view of sections of the eccentrical shaft or axle C, showing where they are hollowed out so as to be kept in their place by the box M, as seen in Fig. 4; A, the sections of cog-wheel; E, the coupling of the eccentrical shaft or axle; F, the lever, and L the thumb-screw.

Fig. 6 is a view of the tongue-regulator H and the thumb-screw L, by which it is worked.

The following is the operation of the plow: In starting to lay off land the crank G is turned round, which turns the rod J and sets the wheel or endless screw B in motion, which in turning acts upon and turns the cog-wheel A and gradually lowers the body of the plow R, together with the plowshares S, to the depth required to be plowed—from one to fourteen inches; and the crank G is held in that position while plowing, unless it is required to plow heavier or lighter in some places. In that case it is only necessary to turn the crank G backward or forward, and the required position will be attained. In case the ground is rough, uneven, or rocky, and it is desired to throw the plowshares S out in order to pass over any such obstruction, it is done almost immediately by reversing the crank G, the machinery being so arranged that two turns of the crank G will either raise or lower the body of the plow R, together with the plowshares S, three inches. When it is necessary for the off wheel to run in the furrow the thumb-screw L, that fastens the lever F to cog-wheel A, is loosened, and the crank G is turned and raises or lowers the nigh wheel to the level of the off wheel when in the furrow, or to any angle required, so that the plowshares S will plow the same depth. The thumb-screw L is then tightened and holds the eccentrical shaft or axle at that level or angle. When traveling the plowshares S can be raised five inches above the ground. When it is required to raise or lower the tongue the thumb-screw L on the tongue-regulator is turned either one way or the other to meet such requirement, and can raise or lower the tongue from one to twelve inches and hold it in the necessary position.

What I claim as my invention, and desire to secure by Letters Patent, is—

The construction of the eccentrical shaft or axle in two parts, so as to be able to raise or lower one wheel without interfering with the other, and the arrangement of the cog-wheel attached to the eccentrical shaft or axle to raise or lower the body of the plow, together with the plowshares, by means of the wheel or endless screw, and their combined arrangement for manufacturing gang-plows.

HENRY SMYTH.

Witnesses:
G. M. RAPTRALL,
ISAAC T. MILLIKEN.